US008726164B2

(12) United States Patent
Drucker et al.

(10) Patent No.: US 8,726,164 B2
(45) Date of Patent: May 13, 2014

(54) MARK-UP EXTENSIONS FOR SEMANTICALLY MORE RELEVANT THUMBNAILS OF CONTENT

(75) Inventors: Steven Drucker, Bellevue, WA (US); Blaise Aguera y Arcas, Seattle, WA (US); Brett D. Brewer, Sammamish, WA (US); Karim Farouki, Seattle, WA (US); Stephen L. Lawler, Redmond, WA (US); Donald James Lindsay, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1215 days.

(21) Appl. No.: 12/129,797

(22) Filed: May 30, 2008

(65) Prior Publication Data

US 2009/0300506 A1 Dec. 3, 2009

(51) Int. Cl.
  *G06F 3/00* (2006.01)
  *G06F 17/00* (2006.01)
(52) U.S. Cl.
  CPC ..................................... *G06F 3/00* (2013.01)
  USPC ............ 715/738; 715/205; 715/251; 715/252
(58) Field of Classification Search
  CPC ................................. G06F 3/00; G06F 17/00
  USPC .................................. 715/738, 205, 251, 252
  See application file for complete search history.

(56) References Cited

U.S. PATENT DOCUMENTS

| 7,546,602 | B2 * | 6/2009 | Hejlsberg et al. ............. 719/313 |
| 8,250,454 | B2 * | 8/2012 | Farouki et al. ................ 715/201 |
| 2003/0020671 | A1 * | 1/2003 | Santoro et al. ................ 345/1.3 |
| 2005/0022133 | A1 * | 1/2005 | Sakamoto et al. ............ 715/760 |
| 2005/0131887 | A1 * | 6/2005 | Rohrabaugh et al. ............. 707/3 |
| 2006/0235941 | A1 * | 10/2006 | Arcas et al. ................... 709/217 |
| 2006/0282444 | A1 * | 12/2006 | Chen et al. .................... 707/100 |
| 2006/0282445 | A1 * | 12/2006 | Chen et al. .................... 707/100 |
| 2007/0110338 | A1 * | 5/2007 | Snavely et al. ................ 382/305 |
| 2007/0198917 | A1 * | 8/2007 | Rohrabaugh et al. ......... 715/513 |
| 2008/0151315 | A1 * | 6/2008 | Flake et al. .................... 358/401 |
| 2009/0177538 | A1 * | 7/2009 | Brewer et al. .................... 705/14 |
| 2009/0235187 | A1 * | 9/2009 | Kim et al. ...................... 715/760 |
| 2009/0276445 | A1 * | 11/2009 | Flake et al. .................... 707/100 |

* cited by examiner

*Primary Examiner* — Tadeese Hailu
(74) *Attorney, Agent, or Firm* — Jim Ross; Leonard Smith; Micky Minhas

(57) ABSTRACT

The claimed subject matter provides a system and/or a method that facilitates rendering of a portion of published content. A browsing session can enable navigation and display of a portion of published content. A render definition enforcer can implement a tag related to the portion of published content with at least one view-level display property, the view-level display property is at least one of a definition to at least one of display or not display the portion of published content based upon a view-level within the browsing session or a definition related to a size scale factor for the portion of published content based upon a view-level within the browsing session. The browsing session can utilize the portion of published content at a view-level in accordance to the view-level display property.

20 Claims, 10 Drawing Sheets

MARK-UP EXTENSIONS FOR SEMANTICALLY MORE RELEVANT THUMBNAILS OF CONTENT

BACKGROUND

Conventionally, browsing experiences related to web pages or other web-displayed content are comprised of images or other visual components of a fixed spatial scale, generally based upon settings associated with an output display screen resolution and/or the amount of screen real estate allocated to a viewing application, e.g., the size of a browser that is displayed on the screen to the user. In other words, displayed data is typically constrained to a finite or restricted space correlating to a display component (e.g., monitor, LCD, etc.).

In general, the presentation and organization of data (e.g., the Internet, local data, remote data, websites, etc.) directly influences one's browsing experience and can affect whether such experience is enjoyable or not. For instance, a website with data aesthetically placed and organized tends to have increased traffic in comparison to a website with data chaotically or randomly displayed. Moreover, interaction capabilities with data can influence a browsing experience. For example, typical browsing or viewing data is dependent upon a defined rigid space and real estate (e.g., a display screen) with limited interaction such as selecting, clicking, scrolling, and the like.

While published content, web pages, or other web-displayed content have created clever ways to attract a user's attention even with limited amounts of screen real estate, there exists a rational limit to how much information can be supplied by a finite display space—yet, a typical user usually necessitates a much greater amount of information be provided to the user. Additionally, a typical user prefers efficient use of such limited display real estate. For instance, most users maximize browsing experiences by resizing and moving windows within display space.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

With advance browsing features (e.g., seamless panning and zooming, etc.), display capabilities are greatly enhanced for web pages, thumbnails, and other displayed data. For instance, a typical web page has a finite amount of screen real estate, wherein a web page can have virtually unlimited real estate by zooming in, zooming out, panning, and the like in a seamless cohesive manner. These dynamic views can quickly change or distort displayed data on a web page such as thumbnails, graphics, logos, trademarks, etc. Yet, certain details or aspects of a web page may need to be viewed at a standardized resolution notwithstanding zoom, pan, etc.

The subject innovation includes a render definition enforcer that enables a portion of published content (e.g., graphic, thumbnail, etc.) to be viewed with defined parameters (e.g., a consistent resolution, scale factor, size, reflow parameters, priority, etc.) corresponding to the view-level at which a web page or published content is viewed. The portion of published content can include a tag that defines parameters (e.g., resolutions, priorities, visibility, etc.) for certain view-levels. Thus, the published content can be viewed at in accordance to the tag definitions regardless of the view-level or view location (e.g., location on a particular view-level) within a browsing session. Furthermore, the tag associated with the portion of published content can define a priority. This priority or ranking can be used to dictate a hierarchical organization on what portions of the published content to display and in which manner to do so.

Additionally, the published content can include pre-defined view levels or view locations. For example, a published content (e.g., web page, web site, document, file, application data, etc.) designer can create optimal view-levels or view locations utilizing parameters within the tag in which a web page is to be displayed such as a default view-level or location, an optimal zoom in level or location, or an optimal zoom out level or location. In other words, a web page can have any suitable number of pre-defined or pre-programmed viewing experiences. Moreover, the claimed subject matter can allow such tagged information (e.g., resolution, priority, view-level, view location, etc.) to be selectively filtered, limiting the viewable information. For example, a user can select to filter all images on a car web site except red cars with two doors. In other aspects of the claimed subject matter, methods are provided that facilitate displaying a portion of published content in accordance to view-level display parameters defined within the tag, wherein the display parameters dictate visibility, scaling factors, reflow parameters, priority, author/designer views, etc.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
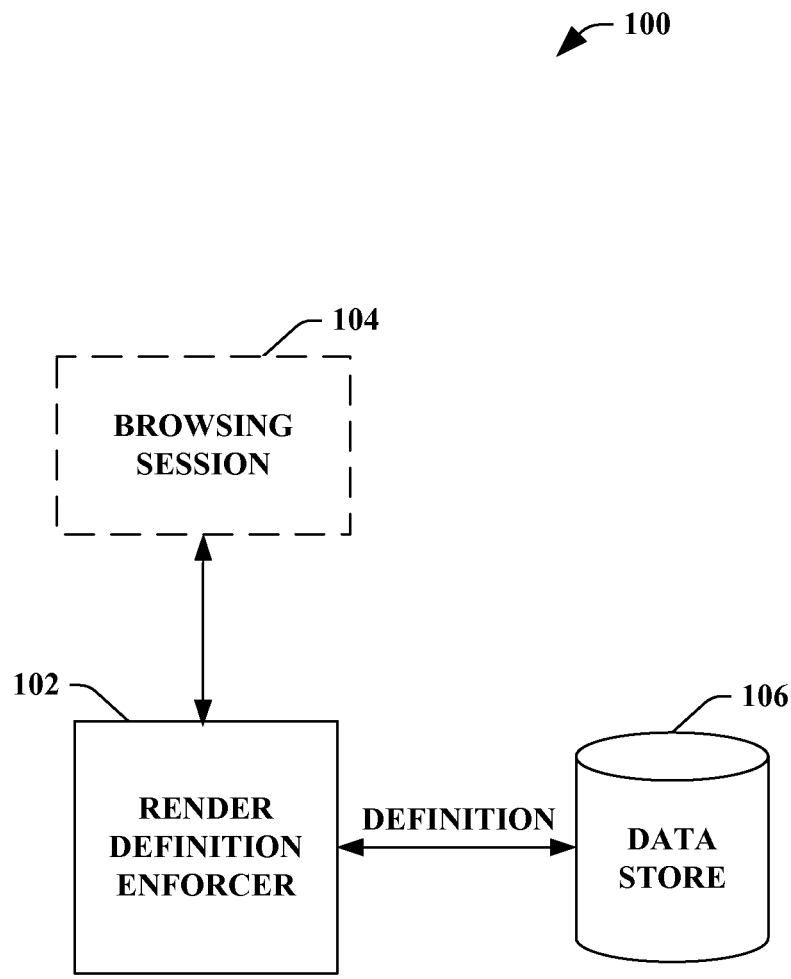
FIG. 1 illustrates a block diagram of an exemplary system that facilitates displaying a portion of published content at a particular view-level in accordance to a tag with defined parameters.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "session," "enforcer," "store," "engine," "aggregator," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates displaying a portion of published content at a particular view-level in accordance to a tag with defined parameters. The system 100 can include a render definition enforcer 102 that enables a portion of published content related to a browsing session 104 to be displayed based upon a tag. In particular, the tag can define a view-level display property (e.g., a priority, a resolution, a visibility attribute, a scale/size factor, an optimal view, a reflow definition, etc.), wherein the render definition enforcer 102 can display the portion of published content based upon the tag and a view-level to which the browsing session 104 is navigated or explored. Moreover, the render definition enforcer 102 can graphically construct a portion of published content (based upon the tag) which can be displayed or rendered. In other words, such view-level to which the browsing session 104 is being navigated, a respective portion of published content can be rendered according to a corresponding tag and defined properties. This, in turn, enables published content (e.g., web pages, web sites, documents, files, text, graphics, data, articles, photographs, etc.) to be displayed as intended by designers, developers, companies, authors, users, and the like.

For example, a collection of published content can be a web page with portions of content such as various graphics, text, audio, video, etc. Each portion of the published content can include a tag to define various display properties, wherein such tag can be defined by default settings, an author, a publisher of such content, a designer, a user, a company, a machine, a business, etc. It is to be appreciated that the number of tags utilized to define display properties is not to be limiting on the subject innovation. Thus, any suitable number of tags can define published content. The tag can define properties related to displaying or rendering the web page (including content) at various view-levels. In particular, the tag can define view-level display properties such as, but not limited to, a visibility attribute for a particular view-level (e.g., display a portion of content or not at a view-level), a resolution at a particular view-level, a priority at a specific view-level, a scale/size factor for a view-level (e.g., shrink or grow factor between view-levels or size definition at a view-level), a reflow definition for a particular view-level (e.g., layout for content upon an adjustment of available display real estate), an optimal view or organization of content at a particular view-level (e.g., author-defined views/layouts for a view-level, pre-defined viewing experiences, etc.), and the like.

The system 100 can further include a data store 106 that can include any suitable data related to the render definition enforcer 102, the browsing session 104, a portion of published content, etc. For example, the data store 106 can include, but not limited to including, tag data, tag definitions, definitions associated with tags, priority data related to a portion of published data, resolution data related to a portion of published data, scale/size factor data related to a portion of published data, visibility data related to a portion of published data (e.g., whether to display data or not to display data), reflow parameters related to a portion of published content, user profiles, user preferences for display, user defined settings, published content data (e.g., author, date, security, etc.), usernames and passwords, etc. For example, the render definition enforcer can receive an instruction to read/display a portion of published content, and a tag related to such content can define view-level display properties. In other words, the data store 106 can store tags and/or definitions that correspond to published content at particular view-levels. It is to be appreciated that the data store 106 can be local, remote, associated in a cloud (e.g., a collection of resources that can be remotely accessed by a user, etc.), and/or any suitable combination thereof.

It is to be appreciated that the data store 106 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 106 of the subject systems and methods is intended to comprise, without being limited to, these and any other suitable types of memory. In addition, it is to be appreciated that the data store 106 can be a server, a database, a hard drive, a pen drive, an external hard drive, a portable hard drive, and the like.

In addition, the system 100 can include any suitable and/or necessary interface component (not shown), which provides various adapters, connectors, channels, communication paths, etc. to integrate the render definition enforcer 102 into virtually any operating and/or database system(s) and/or with one another. In addition, the interface component can provide various adapters, connectors, channels, communication paths, etc., that provide for interaction with the render definition enforcer 102, the browsing session 104, the data store 106, a portion of published content, and any other device and/or component associated with the system 100.

Figure 2:
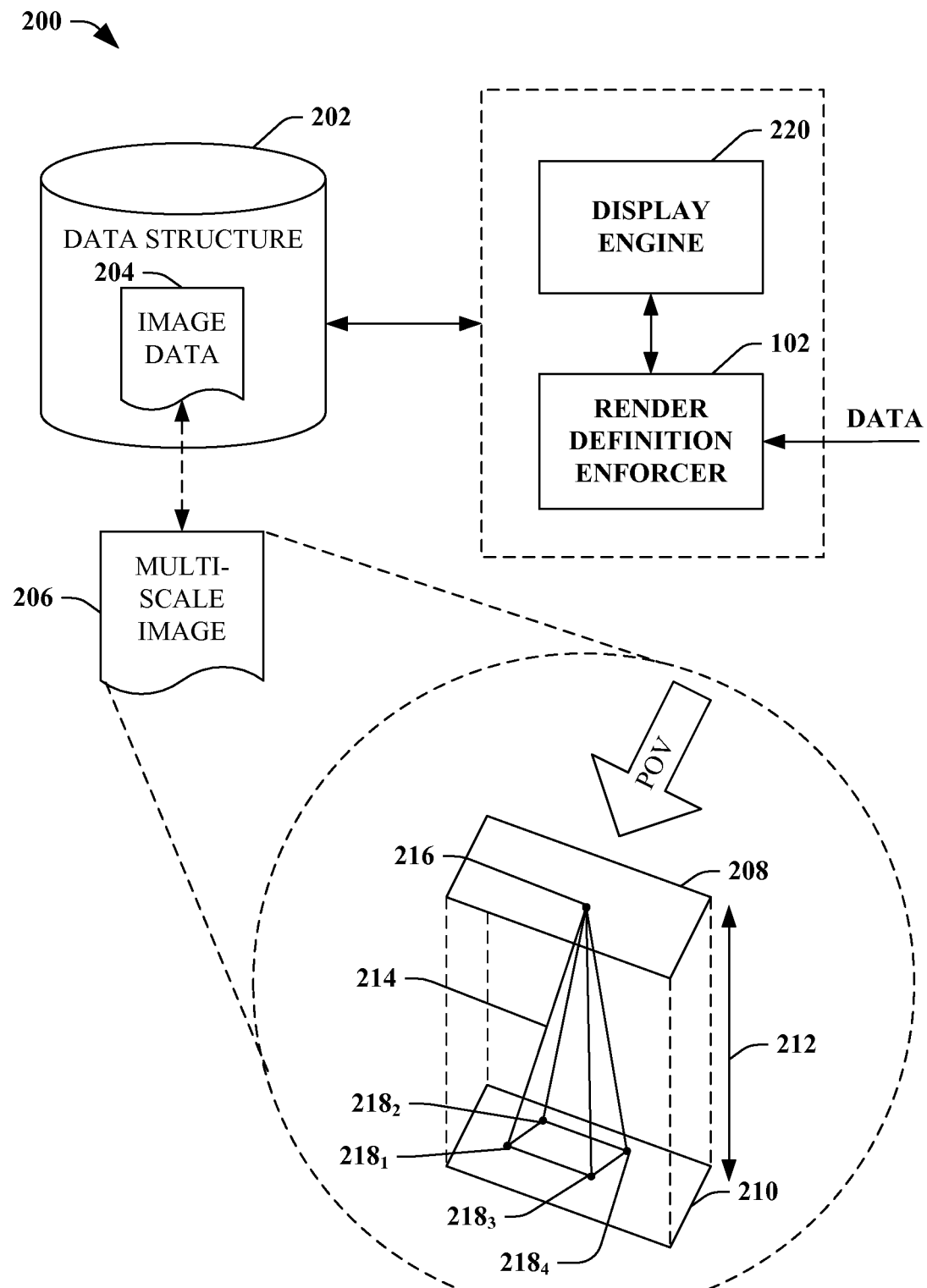
FIG. 2 illustrates a block diagram of an exemplary system that facilitates displaying a portion of published content having two or more view levels associated with a portion of image data.

FIG. 2 illustrates a system 200 that facilitates displaying a portion of published content having two or more view levels associated with a portion of image data. The system 200 can include the render definition enforcer 102 that can receive a portion of data related to tag definitions associated with view-level display properties. In other words, the render definition enforcer 102 can enable a portion of published content to be displayed in accordance with tag definition properties that correspond to a particular view-level at which such portion of published content is being navigated or explored within a browsing session. In general, a content author can utilize the render definition enforcer 102 as a tool to define view-level display properties for view-level changes or size changes (e.g., zoom in, zoom out, pan, etc.). For example, the tag definition for a portion of published content can dictate how to render such portion of published content at various views.

The render definition enforcer 102 can utilize a tag with a view-level display property, wherein such tag can include display rules/definitions for the portion of published content. For example, the portion of published content can include view-level display properties that are defined and/or bound to, for example, an absolute width, an absolute height, a percentage scale of width, a percentage scale of height, etc. For instance, a portion of published content can have a view-level display property for visibility in which such published content can be visible at 25% of absolute width and 30% of absolute height. In another instance, the published content can be not visible at 90% of absolute height and 90% of absolute width. In still another example, the published content can be displayed according to the tag when the view-level is 10% of the absolute width. In another instance, the portion of published content can be displayed between 10% absolute height and 40% absolute height. In still another example of constraints, the published content can be visible between a pair of absolute height and weight boundaries. Thus, published content can be visible or non-visible (based on the tag definition) between 85% absolute height and 50% absolute width and 75% absolute height and 65% absolute width. It is to be appreciated that the above examples are solely for illustrative and explanatory purposes and are not to be limiting on the subject innovation. Moreover, it is to be appreciated and understood that the above described boundaries and/or constraints can be implemented with any of the herein described view-level display properties.

Generally, system 200 can include a data structure 202 with image data 204 that can represent, define, and/or characterize computer displayable multiscale image 206, wherein a display engine 220 can access and/or interact with at least one of the data structure 202 or the image data 204 (e.g., the image data 204 can be any suitable portion of published content that is viewable, displayable, and/or browse able). In particular, image data 204 can include two or more substantially parallel planes of view (e.g., layers, scales, view-levels, etc.) that can be alternatively displayable, as encoded in image data 204 of data structure 202. For example, image 206 can include first plane 208 and second plane 210, as well as virtually any number of additional planes of view, any of which can be displayable and/or viewed based upon a level of zoom 212. For instance, planes 208, 210 can each include content, such as on the upper surfaces that can be viewable in an orthographic fashion. At a higher level of zoom 212, first plane 208 can be viewable, while at a lower level zoom 212 at least a portion of second plane 210 can replace on an output device what was previously viewable.

Moreover, planes 208, 210, et al., can be related by pyramidal volume 214 such that, e.g., any given pixel in first plane 208 can be related to four particular pixels in second plane 210. It should be appreciated that the indicated drawing is merely exemplary, as first plane 208 need not necessarily be the top-most plane (e.g., that which is viewable at the highest level of zoom 212), and, likewise, second plane 210 need not necessarily be the bottom-most plane (e.g., that which is viewable at the lowest level of zoom 212). Moreover, it is further not strictly necessary that first plane 208 and second plane 210 be direct neighbors, as other planes of view (e.g., at interim levels of zoom 212) can exist in between, yet even in such cases the relationship defined by pyramidal volume 214 can still exist. For example, each pixel in one plane of view can be related to four pixels in the subsequent next lower plane of view, and to 216 pixels (a vertex of pyramidal volume 214) in the next subsequent plane of view, and so on. Accordingly, the number of pixels included in pyramidal volume at a given level of zoom, l, can be described as $p=4^l$, where l is an integer index of the planes of view and where l is greater than or equal to zero. It should be appreciated that p can be, in some cases, greater than a number of pixels allocated to image 206 (or a layer thereof) by a display device (not shown) such as when the display device allocates a relatively small number of pixels to image 206 with other content subsuming the remainder or when the limits of physical pixels available for the display device or a viewable area is reached. In these or other cases, p can be truncated or pixels described by p can become viewable by way of panning image 206 at a current level of zoom 212.

However, in order to provide a concrete illustration, first plane 208 can be thought of as a top-most plane of view (e.g., l=0) and second plane 210 can be thought of as the next sequential level of zoom 212 (e.g., l=1), while appreciating that other planes of view can exist below second plane 210, all of which can be related by pyramidal volume 214. Thus, a given pixel in first plane 208, say, pixel 216, can by way of a pyramidal projection be related to pixels $218_1$-$218_4$ in second plane 210. The relationship between pixels included in pyramidal volume 214 can be such that content associated with pixels $218_1$-$218_4$ can be dependent upon content associated with pixel 216 and/or vice versa. It should be appreciated that each pixel in first plane 208 can be associated with four unique pixels in second plane 210 such that an independent and unique pyramidal volume can exist for each pixel in first plane 208. All or portions of planes 208, 210 can be displayed by, e.g. a physical display device with a static number of physical pixels, e.g., the number of pixels a physical display device provides for the region of the display that displays image 206 and/or planes 208, 210. Thus, physical pixels allocated to one or more planes of view may not change with changing levels of zoom 212; however, in a logical or structural sense (e.g., data included in image data 204) each success lower level of zoom 212 can include a plane of view with four times as many pixels as the previous plane of view.

The image data 204 and/or the various planes of view related to the multiscale image 206 can include at least one tag that defines at least one view-level display property. It is to be appreciated that the image data 204 and/or the multiscale image 206 can be a portion of published content or be included in published content. For example, the render definition enforcer 102 can further enforce view-level display properties for the image data 204 and/or the multiscale image 206 in connection with the view-level navigated and/or explored with published content. The render definition enforcer 102 can receive view-level display properties from a tag, wherein such tag can relate to the image data 204 and/or the multiscale image 206. Moreover, the tag can include definitions that can be utilized by the display engine 220 for rendering of published content in accordance therewith. As discussed, the tag can include view-level display properties such as, but not limited to, a visibility attribute for a particular view-level (e.g., display a portion of content or not at a view-level), a resolution at a particular view-level, a priority at a specific view-level, a scale/size factor for a view-level (e.g., shrink or grow factor between view-levels or size definition at a view-level), a reflow definition for a particular view-level (e.g., layout for content upon an adjustment of display real estate), an optimal view or organization of content at a particular view-level (e.g., author-defined views/layouts for a view-level), and the like.

It is to be appreciated that the tag can define view-level properties for a portion of view-levels, a subset of view-levels, a boundary of view-levels, or all views or view-levels (e.g., planes of view) for the image data 204 and/or the multiscale image 206. In other words, a tag can correspond to the image data 204 and/or the multiscale image 206 which defines a plurality of view-level display properties at various levels or planes of view. In addition, it is to be appreciated that the browsing session can be associated with any suitable image data 204 (having multiscale image with pyramidal volumes of data at various view levels or planes of view) or a portion of published content (viewed with the ability to zoom in, zoom out, pan, etc. on content) in at least one of a 2-dimensional (2D) environment or a 3-dimensional (3D) environment. In other words, it is to be appreciated that the render definition enforcer 102 can be utilized with image data or content having pyramidal volumes of data (as described with image data 204 and multiscale image 206) as well as single-plane data as conventionally browsed on the Internet, a network, a wireless network, and the like.

Figure 3:
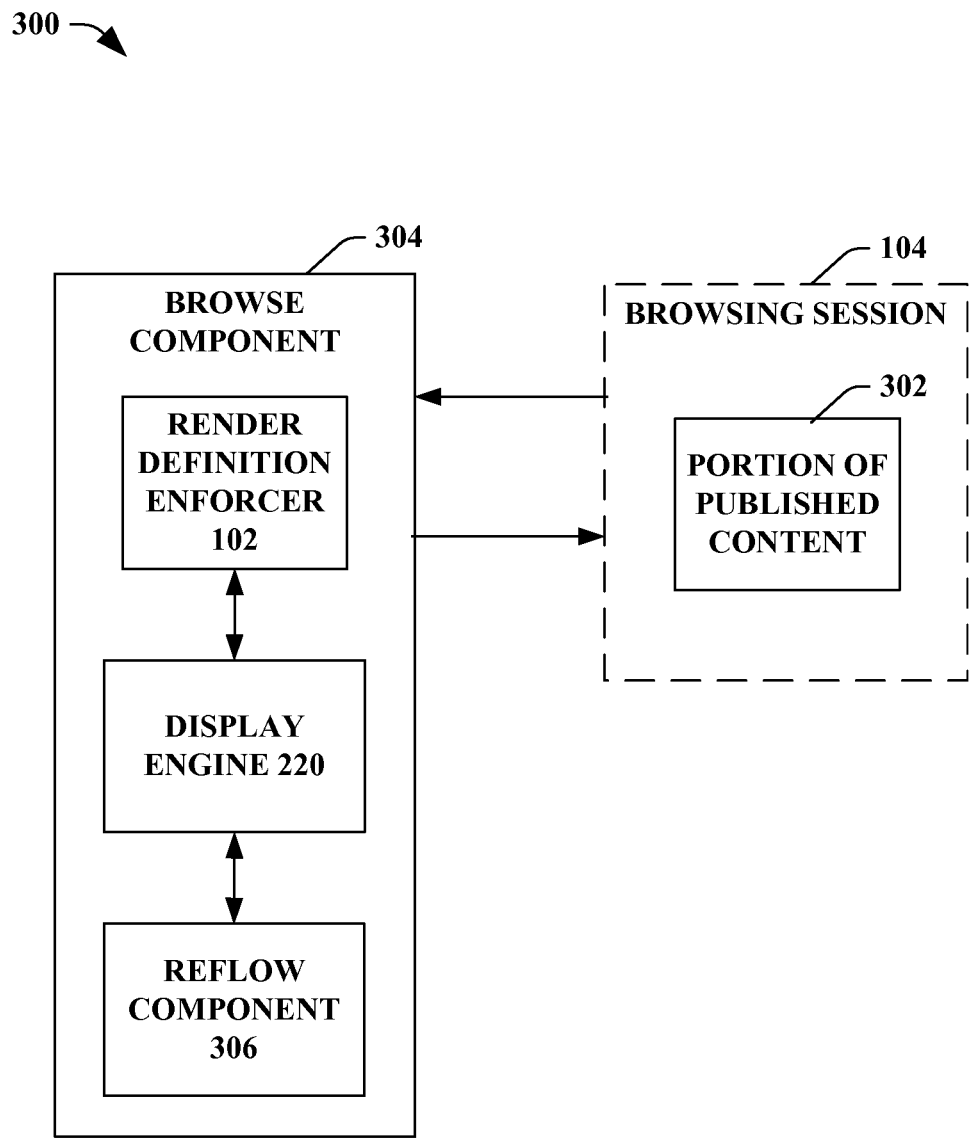
FIG. 3 illustrates a block diagram of an exemplary system that facilitates rendering a portion of published content within a browsing session based upon a tag defining parameters for particular view-levels.

FIG. 3 illustrates a system 300 that facilitates rendering a portion of published content within a browsing session based upon a tag defining parameters for particular view-levels. The system 300 can include the render definition enforcer 102 that can utilize a tag for a portion of published content 302 within the browsing session 104 in order to display such content in accordance with tag-defined view-level properties. The system 300 can further include a browse component 304 that can leverage the display engine 220 and/or the render definition enforcer 102 in order to allow interaction or access with a portion of the published content 302 across a network, server, the web, the Internet, cloud, and the like. The browse component 304 can receive navigation data (e.g., instructions related to navigation within data or published content, view level location, location within a particular view level, etc.), wherein such navigation data can direct to published content with respective tags having view-level display definitions. In other words, the browse component 304 can leverage the display engine 220 and/or the render definition enforcer 102 to enable viewing or displaying published content 302 at a navigated view level in accordance with properties defined within at least one tag linked to the published content 302. For example, the browsing component 302 can receive navigation data that defines a particular location within the browsing session 104 in which a portion of published content 302 can be displayed based upon a view-level associated with the navigation and corresponding tag definitions. It is to be appreciated that the browse component 304 can be any suitable data browsing component such as, but not limited to, a portion of software, a portion of hardware, a media device, a mobile communication device, a laptop, a browser application, a smartphone, a portable digital assistant (PDA), a media player, a gaming device, and the like.

As discussed, the tag can include at least one view-level display property such as, but not limited to a visibility attribute for a particular view-level (e.g., display a portion of content or not display based upon a navigated view-level within the browsing session), a resolution at a particular view-level (e.g., defining the resolution for display for a portion of content based upon a navigated view-level), a priority at a specific view-level (e.g., priority for displaying content based on view-level or navigated location), a scale/size factor for a view-level (e.g., shrink or grow factor between view-levels or size definition at a view-level), a reflow definition for a particular view-level (e.g., layout for content upon an adjustment of display or screen real estate), an optimal view or organization of content at a particular view-level (e.g., author-defined views/layouts for a view-level), etc.

For example, the tag can define a visibility attribute for a portion of published content. The visibility attribute can define whether a portion of data is displayed or not displayed based upon a view-level within the browsing session 104 or a navigated location within the browsing session 104. Thus, a portion of published content at an absolute height and an absolute width can display a graphic at a first view-level and not display such graphic at a second view-level. In another example, the graphic can be displayed according to the visibility attribute if a particular location within the published content is browsed, explored, and/or navigated toward.

The tag can further define a resolution for a portion of published content. For instance, a web site can include a portion of text in which a respective tag can dictate a resolution for such text within various view-levels (e.g., planes of view, etc.) and/or particular areas or locations within such web site. In an example, the web site can include the portion of text with a first resolution on a first view-level and the portion of text with a second resolution on a second view-level within the web site. In other words, various portions of published content can have respective resolutions defined in tags based upon a navigated view-level and/or a particular location within a view-level.

Moreover, the tag can include information related to a priority for the portion of published content 302 at a specific view-level (e.g., priority for displaying content based on view-level or navigated location). In one example, a portion of a picture or graphic can include sub-regions with defined priorities. Thus, a picture of a boat in the water can be a specific priority as well as each sub-region of the picture can include a priority (e.g., the boat portion may be higher priority than the water portion, etc.). In another example, web site can include a plurality of published content such as a first graphic, a second graphic, and a third graphic. A tag (e.g., for each graphic or for the plurality of published content, and/or any suitable combination thereof) can define a priority for displaying such graphics. Thus, at a first view-level on the web site, the priority can dictate system resources (e.g., memory, screen size, processor capability, video card ability, hard drive space, cache, etc.) for use on each graphic. Thus, if a display screen can fit two (2) graphics, the two graphics with the highest priority can be displayed. If a graphic card can only support display of one (1) graphic at a particular resolution, the graphic with the highest priority can be displayed accordingly. It is to be appreciated that the priority attribute allows the portion of published content 302 to be displayed or rendered in accordance to an importance hierarchy, wherein such hierarchy is included in the tag created by a user, designer, developer, a company, a business, a machine, etc.

The render definition enforcer 102 can utilize a tag that defines a scale/size factor for a view-level (e.g., shrink or grow factor between view-levels or size definition at a view-level). For instance, published content can include a first line of text and a second line of text with the first line of text being a dominant text on top. As the published content is navigated (e.g., zoomed, panned, etc.), the first line of text can change size in a first manner whereas the second line of text can change size in a second manner. Typically, zooming in will enlarge the lines of text in a proportional manner, yet the scale/size factor can define shrinking or growing or size for such content in a non-conventional manner (e.g., zooming in on text and maintaining size or scale, zooming out on text and enlarging size or scale, etc.).

The tag can further include a reflow definition for a particular view-level (e.g., layout for content upon an adjustment of display or screen real estate). A reflow can be a re-structuring or re-organization of a portion of published content based upon an adjustment of screen real estate or display area for such published content, wherein such re-structuring or re-organization of content enables optimal viewing in terms of display or real estate. For example, a web page can include text and a picture in which a full screen view displays the text and picture fully. Yet, an adjustment of the viewing pane or window can enable a reflow to occur, wherein the reflow can adjust the picture and/or text size and/or placement to optimize use of the new viewing pane or window measurements. Thus, a resize of a window browsing session can be "reflowed" in order to allow the browsing session to be enhanced for display. The tag can include definitions for implementing a reflow for published content. In other words, a portion of published content can include a tag that defines reflow characteristics to adjust such content to fit in terms of a display screen real estate or viewing pane measurement or browsing session window.

Accordingly, the system 300 can include a reflow component 306 that enables a portion of the published content 302 to be "reflowed" in accordance to the defined parameters and/or attributes within a tag. The reflow component 306 can generate a re-organization or re-structuring of published content based upon the reflow definition for such portion of published content. For instance, a first view-level can include a first reflow layout for a particular resizing of display real estate, whereas a second view-level can include a second reflow layout for another display real estate measurement. It is to be appreciated that the reflow component 306 is depicted as a stand-alone component within the browse component 304 yet the reflow component 306 can be incorporated into the display engine 220, incorporated into the render definition enforcer 102, a stand-alone component separate of the browse component 304, and/or any suitable combination thereof.

Additionally, the published content 302 can include pre-defined view levels or view locations defined or specified by a tag or markup. For example, a published content (e.g., web page, web site, etc.) designer can create optimal view levels or view locations utilizing parameters within the tag in which a web page is to be displayed such as a default view level or location, an optimal zoom in level or location, or an optimal zoom out level or location. In other words, the web page can have any suitable number of pre-defined or pre-programmed viewing experiences. Moreover, the system 300 can allow such tagged information (e.g., resolution, priority, view level, view location, etc.) to be selectively filtered, limiting the viewable information. For example, a user can select to filter all images on a car web site except red cars with two doors.

Figure 4:
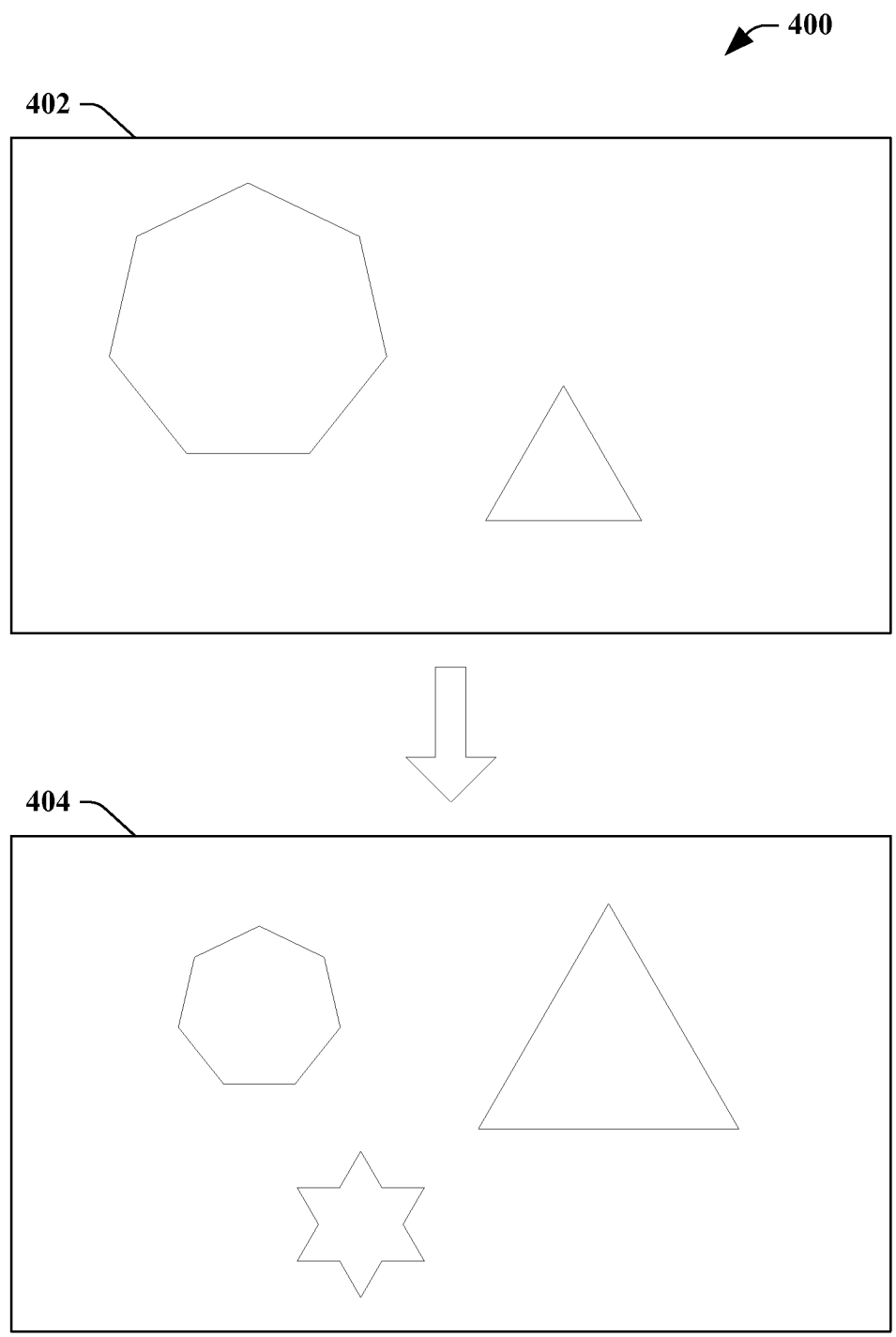
FIG. 4 illustrates a block diagram of an exemplary system that facilitates displaying portions of published content within a browsing session.

FIG. 4 illustrates a system 400 that facilitates displaying portions of published content within a browsing session. The system 400 depicts a first browsing session 402 and a second browsing session 404. The first browsing session 402 and the second browsing session 404 can have respective absolute heights and an absolute widths in which exploration and/or navigation of published content can be of a view measured by a positive real number within a range from 0% to 100% for absolute width and a positive real number within a range of 0% to 100% for absolute height. The first browsing session 402 can be navigated to at least one of a view-level or a particular location (e.g., a location on a view-level, an area on a planar view of the published content within the browsing session, etc.).

For example, at this depicted location or view-level, the tag can define particular view-level display properties such as a visibility attribute and a scale/size factor in which a hexagon is displayed at a particular size/scale and a triangle is displayed at a particular size/scale, yet a star is not displayed. The second browsing session 404, however, can display disparate portion of published content in accordance with the tag and view-level display properties. As depicted, the second browsing session 404 can display the hexagon at a size/scale, the triangle at a size/scale, and a star at a size/scale based upon the tag definition(s) respectively. It is to be appreciated that the tag definition can correspond to at least one of a view-level associated with the browsing session 404 or a location or area navigated within the browsing session 404. Furthermore, the transition between the first browsing session 402 and the second browsing session 404 can be with a pan or zoom in relation to a single-planed published content or a multiscale or multi-planar published content.

In another example, a slide show including one or more slides of data can include a tag that defines view-level display properties. Typically, a slide show is browsed or displayed by showing a first slide as a preview of content. Yet, the tag and view-level display properties can be defined such that a particular slide of data is utilized as a preview of content. In addition, the tag can enable various portions of data related to the slide show to include defined view-level properties such that a portion of data within the slide show can include a visible attribute, a size/scale factor, a priority attribute, a reflow attribute, etc. In one instance, a first view of the slide show (e.g., 50% of slide show slides are shown) can display or render a portion of the slides or data to which has been identified or tagged for such view. Thus, rather than showing the first 10 slides of 50 slides, the tag can ensure a selected 10 slides (e.g., slides defined as of importance, etc.) of the 50 slides can be displayed.

Figure 5:
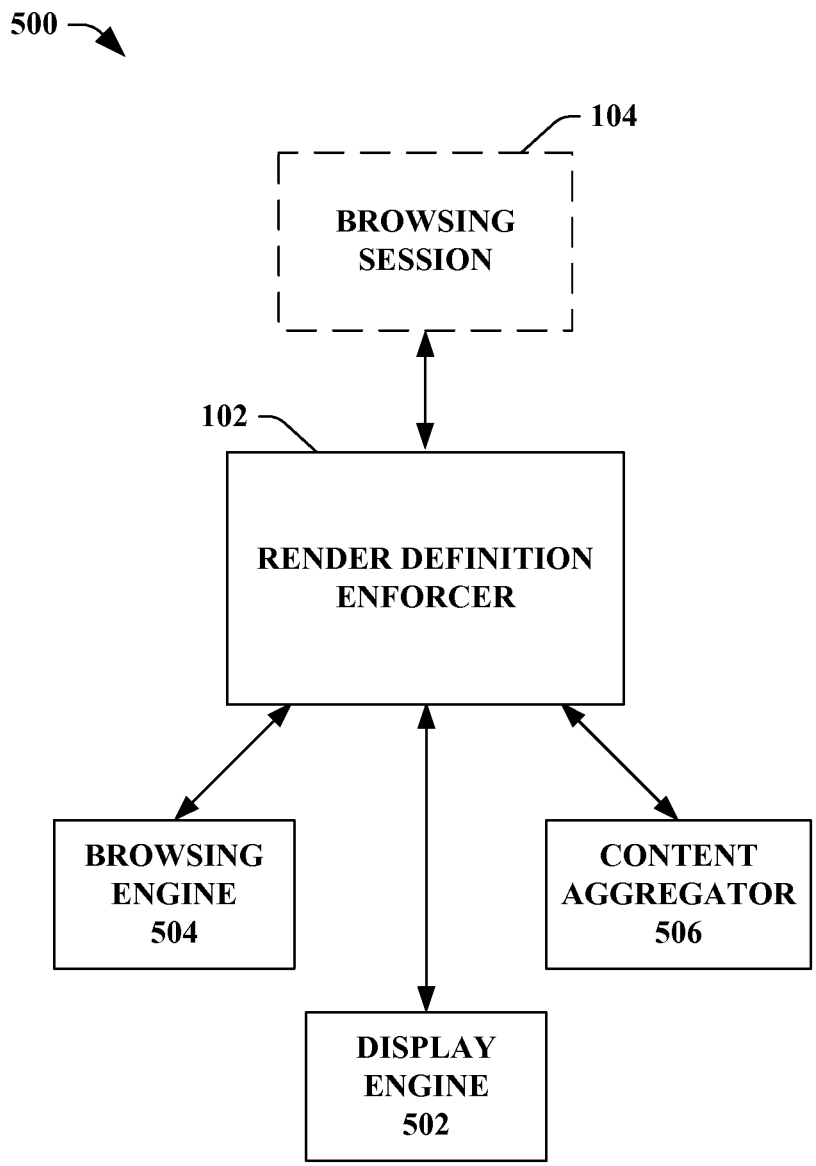
FIG. 5 illustrates a block diagram of exemplary system that facilitates enhancing implementation of rendering published content with view-level tag definitions with a display technique, a browse technique, and/or a virtual environment technique.

FIG. 5 illustrates a block diagram of exemplary system that facilitates enhancing implementation of rendering published content with view-level tag definitions with a display technique, a browse technique, and/or a virtual environment technique. The system 500 can include the render definition enforcer 102, the browsing session 104, and/or a portion of published content as described above. The system 500 can further include a display engine 502 that enables seamless pan and/or zoom interaction with any suitable displayed data or published content, wherein such data can include multiple scales or views and one or more resolutions associated therewith. In other words, the display engine 502 can manipulate an initial default view for displayed data by enabling zooming (e.g., zoom in, zoom out, etc.) and/or panning (e.g., pan up, pan down, pan right, pan left, etc.) in which such zoomed or panned views can include various resolution qualities. The display engine 502 enables visual information to be smoothly browsed regardless of the amount of data involved or bandwidth of a network. Moreover, the display engine 502 can be employed with any suitable display or screen (e.g., a portable device, cellular device, monitor, plasma television, etc.). The display engine 502 can further provide at least one of the following benefits or enhancements: 1) speed of navigation can be independent of size or number of objects (e.g., data); 2) performance can depend on a ratio of bandwidth to pixels on a screen or display; 3) transitions between views can be smooth; and 4) scaling is near perfect and rapid for screens of any resolution.

For example, an image can be viewed at a default view with a specific resolution. Yet, the display engine 502 can allow the image to be zoomed and/or panned at multiple views or scales (in comparison to the default view) with various resolutions. Thus, a user can zoom in on a portion of the image to get a magnified view at an equal or higher resolution. By enabling the image to be zoomed and/or panned, the image can include virtually limitless space or volume that can be viewed or explored at various scales, levels, or views with each including one or more resolutions. In other words, an image can be viewed at a more granular level while maintaining resolution with smooth transitions independent of pan, zoom, etc. Moreover, a first view may not expose portions of information or data on the image until zoomed or panned upon with the display engine 502.

A browsing engine 504 can also be included with the system 500. The browsing engine 504 can leverage the display engine 502 to implement seamless and smooth panning and/or zooming for any suitable data browsed in connection with at least one of the Internet, a network, a server, a website, a web page, and the like. It is to be appreciated that the browsing engine 504 can be a stand-alone component, incorporated into a browser, utilized with in combination with a browser (e.g., legacy browser via patch or firmware update, software, hardware, etc.), and/or any suitable combination thereof. For example, the browsing engine 504 can be incorporate Internet browsing capabilities such as seamless panning and/or zooming to an existing browser. For example, the browsing engine 504 can leverage the display engine 502 in order to provide enhanced browsing with seamless zoom and/or pan on a website, wherein various scales or views can be exposed by smooth zooming and/or panning.

The system 500 can further include a content aggregator 506 that can collect a plurality of two dimensional (2D) content (e.g., media data, images, video, photographs, metadata, trade cards, etc.) to create a three dimensional (3D) virtual environment that can be explored (e.g., displaying each image and perspective point). In order to provide a complete 3D environment to a user within the virtual environment, authentic views (e.g., pure views from images) are combined with synthetic views (e.g., interpolations between content such as a blend projected onto the 3D model). For instance, the content aggregator 506 can aggregate a large collection of photos of a place or an object, analyze such photos for similarities, and display such photos in a reconstructed 3D space, depicting how each photo relates to the next. It is to be appreciated that the collected content can be from various locations (e.g., the Internet, local data, remote data, server, network, wirelessly collected data, etc.). For instance, large collections of content (e.g., gigabytes, etc.) can be accessed quickly (e.g., seconds, etc.) in order to view a scene from virtually any angle or perspective. In another example, the content aggregator 506 can identify substantially similar content and zoom in to enlarge and focus on a small detail. The content aggregator 506 can provide at least one of the following: 1) walk or fly through a scene to see content from various angles; 2) seamlessly zoom in or out of content independent of resolution (e.g., megapixels, gigapixels, etc.); 3) locate where content was captured in relation to other content; 4) locate similar content to currently viewed content; and 5) communicate a collection or a particular view of content to an entity (e.g., user, machine, device, component, etc.).

It is to be appreciated that any suitable data within the browsing session 104 and/or interacted with utilizing at least one of the display engine 502, the browsing engine 504, and/or the content aggregator 506 can include a tag with defined view-level display properties. For example, the display engine 502 can analyze data or published content within a browsing session in which navigation and/or view levels can be displayed in accordance with a tag related to such data or published content. In another example, the browsing engine 504 can be leveraged in which explored data can be evaluated in order to render and/or display such data based upon tag definitions associated with view-level display properties. In still another example, data exploration (e.g., viewed data, perspective of such viewed data, etc.) within a 3D environment created from 2D content can include tags related therewith that can define view-level display properties as discussed herein.

Figure 6:
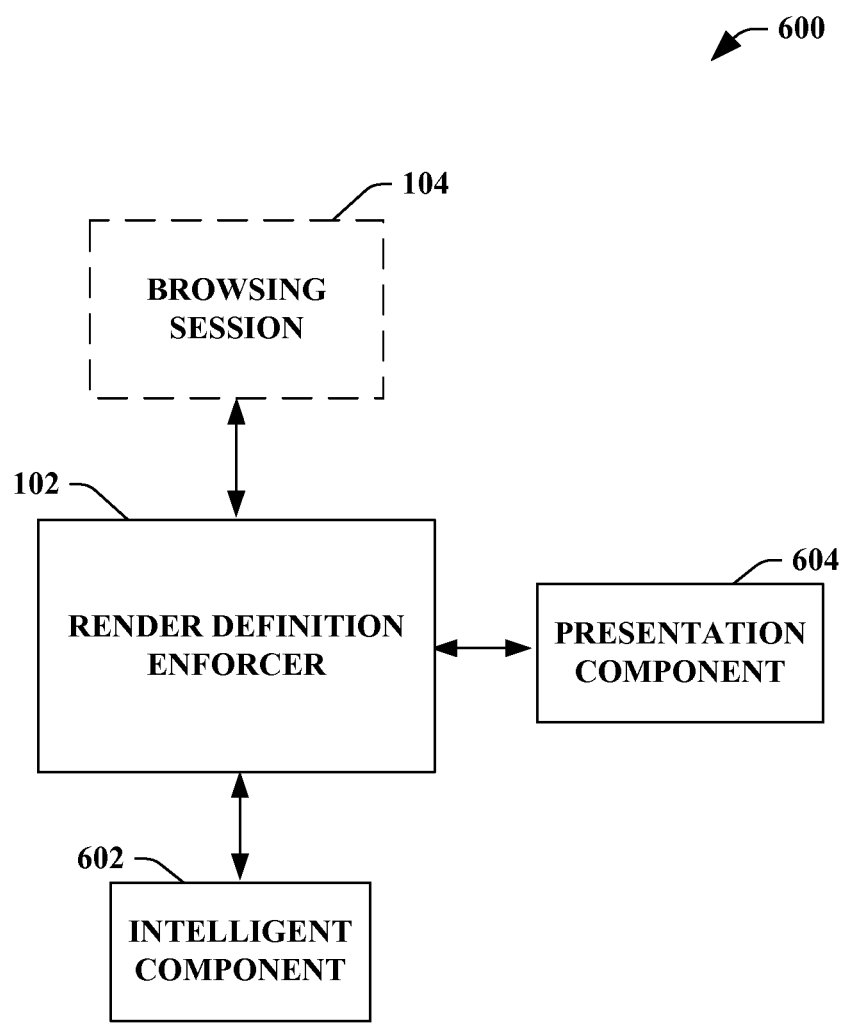
FIG. 6 illustrates a block diagram of an exemplary system that facilitates utilizing a tag to define view-level display properties for published content.

FIG. 6 illustrates a system 600 that employs intelligence to facilitate utilizing a tag to define view-level display properties for published content. The system 600 can include the render definition enforcer 102, the browsing session 104, a portion of published content which can be substantially similar to respective enforcers, sessions, and content described in previous figures. The system 600 further includes an intelligent component 602. The intelligent component 602 can be utilized by the render definition enforcer 102 to facilitate rendering a portion of published content in accordance with view-level display properties defined within a tag or markup. For example, the intelligent component 602 can infer view-level display properties, user preferences, author preferences for defining view-level display properties, user hardware optimal settings in connection with tag definitions, tag data, reflow layouts, user preferences related to reflow re-organizations, reflow settings associated with hardware/resource capabilities, optimal views defined within a tag based upon historic data related to an author, etc.

The intelligent component 602 can employ value of information (VOI) computation in order to identify view-level display properties to enforce for a portion of published content within at least one browsing session. For instance, by utilizing VOI computation, the most ideal and/or appropriate view-level display properties for a particular user can be determined. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The render definition enforcer 102 can further utilize a presentation component 604 that provides various types of user interfaces to facilitate interaction between a user and any component coupled to the render definition enforcer 102. As depicted, the presentation component 604 is a separate entity that can be utilized with the render definition enforcer 102. However, it is to be appreciated that the presentation component 604 and/or similar view components can be incorporated into the render definition enforcer 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the render definition enforcer 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
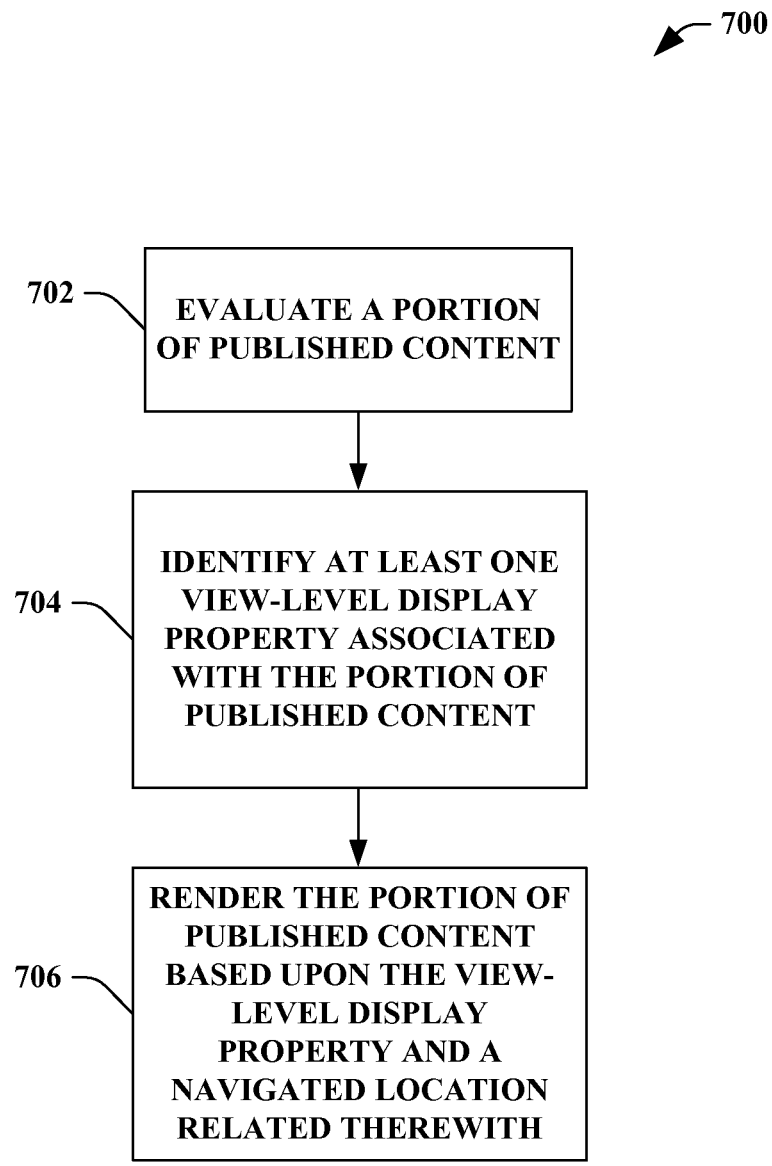
FIG. 7 illustrates an exemplary methodology for displaying a portion of published content at a particular view-level in accordance to a tag with defined parameters.
Figure 8:
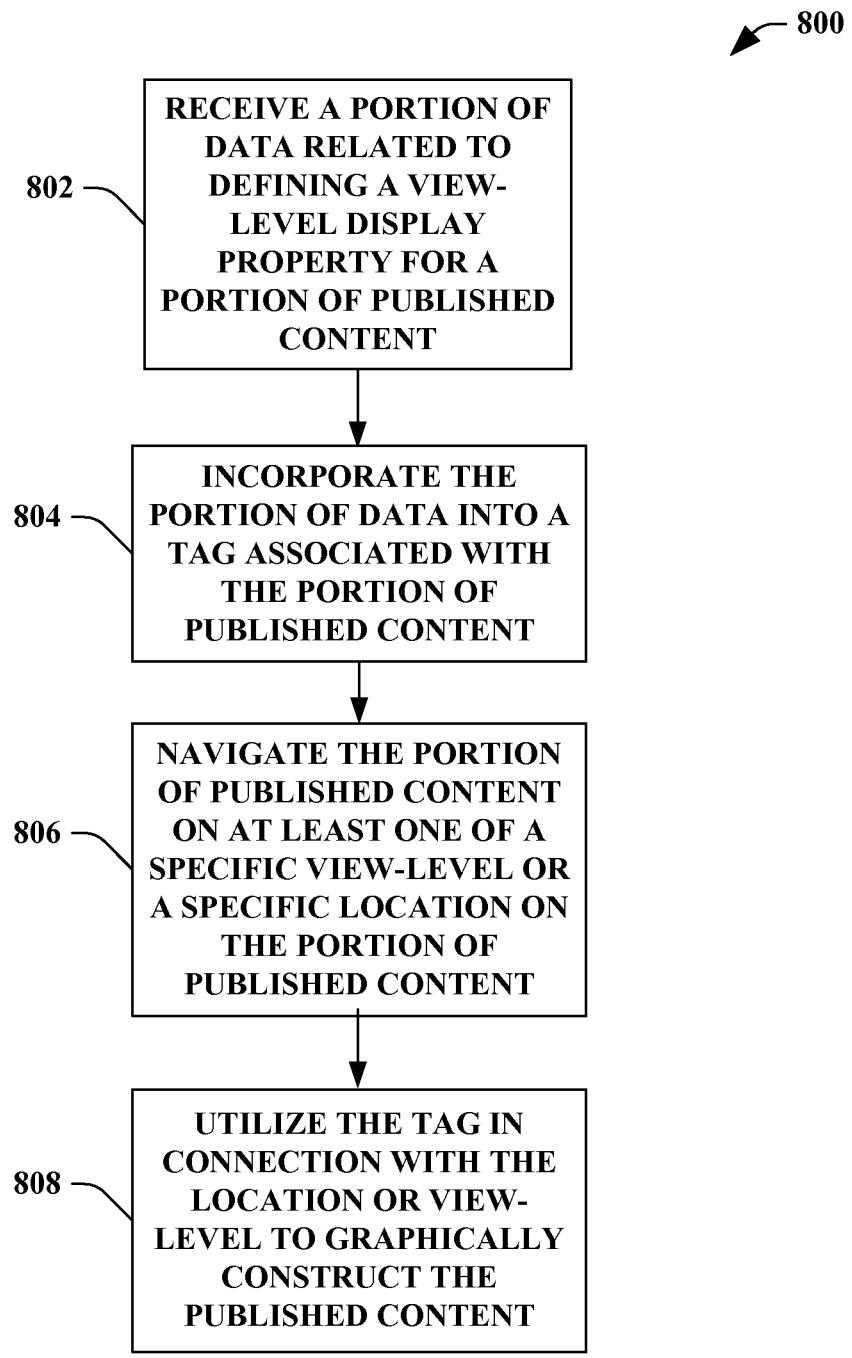
FIG. 8 illustrates an exemplary methodology that facilitates rendering a portion of published content within a browsing session based upon a tag defining parameters for particular view-levels.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates displaying a portion of published content at a particular view-level in accordance to a tag with defined parameters. At reference numeral 702, a portion of published content can be evaluated. The portion of published content can be any suitable data that can be viewed, displayed, browsed, navigated, explored, and the like. For example, the published data can be a web page, a web site, a portion of a web page, a portion of a web site, a portion of a graphic, a picture, a photograph, a portion of text, a portion of audio, a portion of video, a portion of a photograph, a document (e.g., word processing document, a graphic design document, a technical drawing document, a slide show document, etc.), a file (e.g., a thumbnail, a tile representation, etc.), a data file, an article, etc. Moreover, the evaluation of the portion of published content can include analysis related to metadata, markup language information, tags, and the like.

At reference numeral 704, at least one view-level display property associated with the portion of published content can be identified. In particular, the evaluation of the portion of published content can enable a view-level display property to be identified within a tag, metadata, markup, etc. The view-level display property can be, but is not limited to being, a visibility attribute for a particular view-level (e.g., display a portion of content or not display based upon a navigated view-level within the browsing session), a resolution at a particular view-level (e.g., defining the resolution for display for a portion of content based upon a navigated view-level), a priority at a specific view-level (e.g., priority for displaying content based on view-level or navigated location), a scale/size factor for a view-level (e.g., shrink or grow factor between view-levels or size definition at a view-level), a reflow definition for a particular view-level (e.g., layout for content upon an adjustment of display or screen real estate), and/or an optimal view or organization of content at a particular view-level (e.g., author-defined views/layouts for a view-level).

At reference numeral 706, the portion of published content can be rendered based upon the view-level display property and a navigated location related therewith. In other words, based upon a location being viewed or explored (e.g., a view-level, a plane of view, a location on a plane, an area within a plane, a location within a 3D environment, etc.), the view-level display property can be enforced in order to be displayed and/or rendered accordingly.

FIG. 8 illustrates a method 800 for rendering a portion of published content within a browsing session based upon a tag defining parameters for particular view-levels. At reference numeral 802, a portion of data related to defining a view-level display property for a portion of published content can be received. For instance, the portion of data related to definitions can be received from a user, a developer, a network, a content author, a company, a business, an enterprise, the Internet, a machine, a program, a portion of hardware, a portion of software, etc. At reference numeral 804, the portion of data can be incorporated into a tag associated or linked to the portion of published content. For example, view-level display property data can be embedded, annotated, included, incorporated, and the link into a tag, markup, or any other suitable metadata related to the portion of published content. In one example, the view-level display property information can be included in a specific tag related to such attributes, whereas another example allows such properties to be included with a tag including markup data, etc.

At reference numeral 806, the portion of published content can be navigated at a specific view-level or a specific location on the portion of published content. For instance, published content can be a 2D environment or a 3D environment. Moreover, within a 2D environment, there can be one or more planes of view. With a single-plane of view in a 2D environment, navigation can include standard zooming (magnifying or telescoping of view), panning, etc. Within a 2D environment having multiple planes of view or a 3D environment, navigation can be within a particular location on a particular view-level or a particular view-level itself.

At reference numeral 808, the tag can be utilized in connection with the location or view-level to graphically construct the portion of published content. It is to be appreciated that the graphically constructed portion of published content can be displayed or rendered by any suitable display engine, display component, video component (e.g., video card, etc.), and the like.

Figure 9:
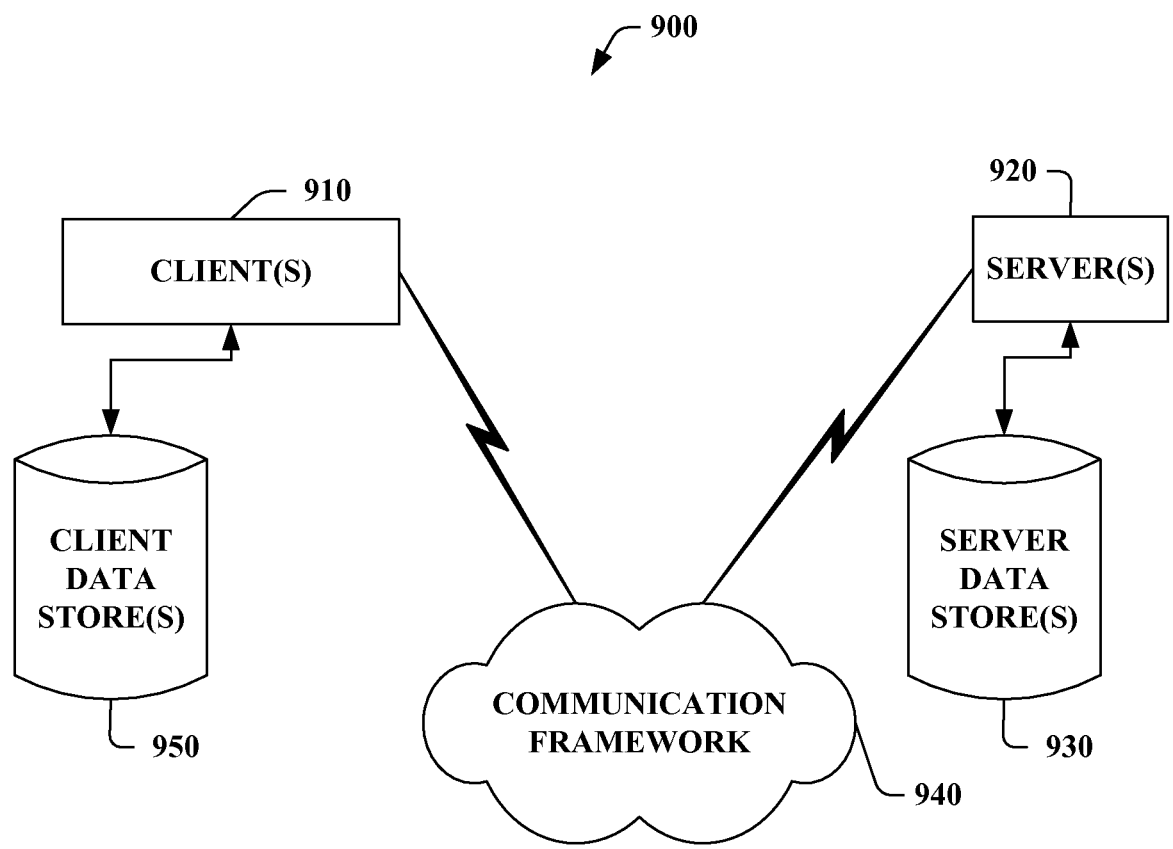
FIG. 9 illustrates an exemplary networking environment, wherein the novel aspects of the claimed subject matter can be employed.
Figure 10:
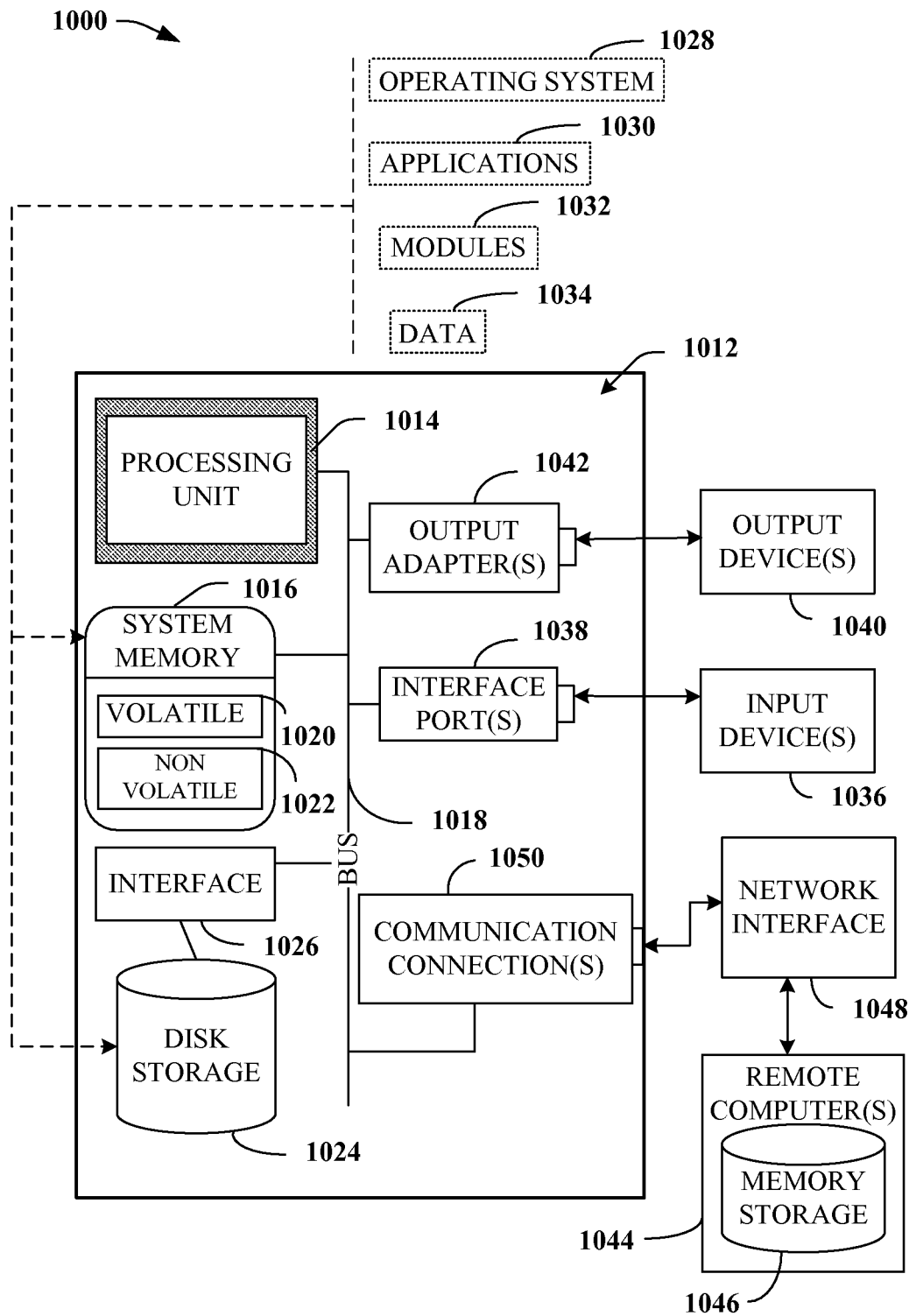
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a render definition enforcer that can receive and enable display or rendering for published content based upon view-level display properties defined within a tag, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates rendering of published content within a browsing session, comprising:
   a browsing session that enables navigation and display of portions of published content that includes a data structure having image data that at least one of represents, defines, or characterizes a multiscale image having pyramidal volumes of data, the image data encoded with two or more substantially parallel planes of view alternatively displayable as view levels;
   a render definition enforcer that employs a tag related to rendering the portions of published content with at least one view-level display property, wherein each portion of the published content can include a respective tag having a tag definition for respective view-level display properties, comprising at least one of the following:
      a definition to at least one of display or not display the portions of published content based upon a view-level or a location on a view-level within the browsing session; or
      a definition related to a size/scale factor for the portions of published content based upon a view-level or a location on a view-level within the browsing session;
   the browsing session utilizes the portions of published content at a view-level or a location on a view-level in accordance to the view-level display property; and
   a microprocessor that executes computer-executable instructions stored in a memory associated with at least one of the browsing session or the render definition enforcer.

2. The system of claim 1, the view-level display property is a resolution definition that indicates a display resolution for a portion of published content based upon a view-level or a location on a view-level in connection with the browsing session.

3. The system of claim 1, the view-level display property is a priority definition that dictates a hierarchical organization for the portions of published content based upon a view-level or a location on a view-level navigated within the browsing session.

4. The system of claim 1, the view-level display property is a pre-defined view for the portions of published content based upon a navigated view-level or location on a view-level within the browsing session, the pre-defined view is at least one of an optimal display perspective set by an author of the portions of published content, a default view-level, a default location, an optimal zoom in on a view-level, an optimal zoom out on a view-level, or a pre-programmed viewing experience for the portions of published content.

5. The system of claim 1, the view-level display property is a reflow definition that automatically defines a setting related to adjusting the portions of published content to display within a viewing pane for the browsing session based upon a view-level or a location on a view-level navigated within the browsing session.

6. The system of claim 5, further comprising a reflow component that reflows the portions of published content utilizing the reflow definition, the reflow is a re-structured display layout for the portions of published content based upon at least one of a resizing or changing of display area utilized for the browsing session.

7. The system of claim 1, the view-level display property is linked to a view-level or location within the portions of published content by a first percentage number related to absolute width and a second percentage number related to absolute height, the first percentage number is a positive real number and the second percentage number is a positive real number.

8. The system of claim 1, the location on a view-level for the portions of published content is data displayed within a display real estate in connection with the browsing session.

9. The system of claim 1, further comprising a display engine that browses the portions of published content within the browsing session, the display engine enables at least one of a seamless pan or a zoom interaction with the portions of the published content, wherein such content includes the multiscale image having one or more planes of view.

10. The system of claim 1, wherein the multiscale image comprises at least two substantially parallel planes of view in which a first plane and a second plane are alternatively displayable based upon a level of zoom and which are related by a pyramidal volume, the multiscale image includes the tag with at least one view-level display property.

11. The system of claim 10, the second plane of view displays a portion of the first plane of view at one of a different scale or a different resolution based upon the tag with at least one view-level display property.

12. The system of claim 10, the second plane of view displays a portion of the image data that is graphically or visually unrelated to the first plane of view based upon the tag with at least one view-level display property.

13. The system of claim 10, the second plane of view displays a portion of the image data that is disparate than the portion of the image data associated with the first plan of view based upon the tag with at least one view-level display property.

14. The system of claim 1, the browsing session includes a 3-dimensional (3D) virtual environment created from a plurality of 2-dimensional (2D) content of an image that is navigated by the user, each portion of 2D content includes a perspective of the image, a portion of the image which is aggregated to create the 3D virtual environment of such image, and the tag with at least one view-level display property.

15. The system of claim 1, further comprising a browse component that leverages at least one of a display engine or the render definition enforcer to interact with the portions of the published content across at least one of a network, a server, a web, the Internet, or a cloud.

16. The system of claim 1, the portions of published content associated with the browsing session is graphically constructed in accordance with the tag and at least one view-level display property.

17. A computer-implemented method that facilitates enhancing display of published content within a browsing session, comprising acts of:
evaluating portions of published content that includes a data structure having image data that at least one of represents, defines, or characterizes a multiscale image having pyramidal volumes of data, the image data encoded with two or more substantially parallel planes of view alternatively displayable as view levels;
identifying at least one view-level display property associated with each of the respective portions of published content, the at least one view-level display property dictates visibility of the respective portions of published content within a browsing session;
rendering the respective portions of published content based upon the respective view-level display properties and a respective navigated location related to the each of the respective portions of published content;
reflowing the portions of published content utilizing a reflow definition by re-structuring a display layout for the portions of published content based upon at least one of a resizing or changing of display area utilized for the browsing session; and
utilizing a microprocessor to execute instructions stored in memory to perform at least one of the acts of evaluating, identifying, or rendering.

18. The method of claim 17, the view-level display property is at least one of the following:
a definition related to a size/scale factor for the portions of published content based upon a view-level or a location on a view-level within the browsing session;
a resolution definition that indicates a display resolution for a portion of published content based upon a view-level or a location on a view-level in connection with the browsing session;
a priority definition that dictates a hierarchical organization for the portions of published content based upon a view-level or a location on a view-level navigated within the browsing session; and
the view-level display property is a pre-defined view for the portions of published content based upon a navigated view-level or location on a view-level within the browsing session, the pre-defined view is an optimal display perspective set by an author of the portions of published content.

19. The method of claim 17, wherein the rendering of the portion of published content further comprises acts of:
receiving a portion of data related to defining the view-level display property for the portion of published content;
incorporating the portion of data into a tag associated with the portion of published content;
navigating the portion of published content at a specific location on the portion of published content; and
utilizing the tag in connection with the location to graphically construct the portion of published content.

20. A computer-readable storage medium comprising computer-executable instructions that when executed by a microprocessor facilitate rendering of portions of published content within a browsing session, the instructions cause the microprocessor to perform acts of:
enabling navigation and display of portions of published content that includes a data structure having image data that at least one of represents, defines, or characterizes, the image data having pyramidal volumes of data and encoded with two or more substantially parallel planes of view alternatively displayable as view levels;
employing a tag having a tag definition related to the respective portions of published content with at least one view-level display property, the view-level display property is at least one of the following:
a definition to at least one of display or not display the portions of published content based upon a view-level or a location on a view-level within the browsing session; or
a definition related to a size/scale factor for the portions of published content based upon a view-level or a location on a view-level within the browsing session; and
graphically constructing the portions of published content at a view-level or a location on a view-level in accordance to the view-level display property.

* * * * *